United States Patent
Yeh et al.

(10) Patent No.: US 10,732,671 B2
(45) Date of Patent: Aug. 4, 2020

(54) COVER STRUCTURE AND ELECTRONIC DEVICE

(71) Applicants: Hsin Yeh, Taipei (TW); Chih-Wen Chiang, Taipei (TW); Jyh-Chyang Tzou, Taipei (TW)

(72) Inventors: Hsin Yeh, Taipei (TW); Chih-Wen Chiang, Taipei (TW); Jyh-Chyang Tzou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 99 days.

(21) Appl. No.: 16/000,913

(22) Filed: Jun. 6, 2018

(65) Prior Publication Data
US 2019/0278325 A1 Sep. 12, 2019

(30) Foreign Application Priority Data
Mar. 9, 2018 (TW) .............................. 107108146 A (51) Int. Cl.
*G06F 1/16* (2006.01)
(52) U.S. Cl.
CPC .......... *G06F 1/1616* (2013.01); *G06F 1/1666* (2013.01); *G06F 1/1681* (2013.01);
(Continued)
(58) Field of Classification Search
CPC .... G06F 1/1681; G06F 1/1666; G06F 1/1616; G06F 1/1632; G06F 1/1669; G06F 1/1654; G06F 1/1601; G06F 1/1667; G06F 2200/1632; G06F 1/1626; G06F 1/16; G06F 2200/1612; G06F 1/1637; G06F 2200/1633; H05K 5/0226; H05K 5/0239; H05K 5/03;
(Continued)

(56) References Cited

U.S. PATENT DOCUMENTS

| 5,712,760 | A | 1/1998 | Coulon et al. | |
| D664,602 | S * | 7/2012 | Chiu | D14/432 |

(Continued)

FOREIGN PATENT DOCUMENTS

| CN | 103399617 | 11/2013 |
| TW | M525043 | 7/2016 |

OTHER PUBLICATIONS

Office Action of Taiwan Counterpart Application, dated Nov. 14, 2018, pp. 1-14.

*Primary Examiner* — Adrian S Wilson
(74) *Attorney, Agent, or Firm* — JCIPRNET (57) ABSTRACT

A cover structure is suitable for a portable device. The cover structure includes a body, a first flexible component, an accommodation component, a second flexible component and a connection component. The first flexible component is connected to the body, and the accommodation component is connected to the first flexible component. The accommodation component has an accommodation groove configured for accommodating an object. The second flexible component is connected to the accommodation component, and the first flexible component. The connection component is connected to the second flexible component. The connection component is connected to the body, and the connection component is configured for being connected to a portable device. An electronic device is also provided.

28 Claims, 5 Drawing Sheets

(52) U.S. Cl.
CPC .... *G06F 1/1626* (2013.01); *G06F 2200/1632* (2013.01); *H01H 2223/05* (2013.01); *H01H 2223/052* (2013.01)

(58) Field of Classification Search
CPC ........ H05K 5/023; H05K 5/02; H05K 5/0017; H05K 5/0204; H05K 7/00; H05K 7/16; H01H 2223/052; H01H 2223/05; A47B 97/001
See application file for complete search history.

(56) References Cited

U.S. PATENT DOCUMENTS

| | | | | |
|---|---|---|---|---|
| 8,498,100 | B1* | 7/2013 | Whitt, III | G06F 1/1618 |
| | | | | 361/679.17 |
| D693,337 | S * | 11/2013 | Chen | D14/315 |
| 9,946,296 | B2* | 4/2018 | Smith | G06F 1/1669 |
| 10,114,410 | B2* | 10/2018 | Ke | G06F 1/1618 |
| 2012/0188693 | A1* | 7/2012 | Chiang | F16M 11/10 |
| | | | | 361/679.01 |
| 2013/0031289 | A1* | 1/2013 | Yeh | G06F 1/1632 |
| | | | | 710/303 |
| 2016/0091927 | A1* | 3/2016 | Tzou | G06F 1/1626 |
| | | | | 361/679.58 |

* cited by examiner

COVER STRUCTURE AND ELECTRONIC DEVICE

CROSS-REFERENCE TO RELATED APPLICATION

This application claims the priority benefit of Taiwan application serial no. 107108146, filed on Mar. 9, 2018. The entirety of the above-mentioned patent application is hereby incorporated by reference herein and made a part of this specification.

BACKGROUND

Field of the Invention

The invention relates to a cover structure and an electronic device and more particularly, to a cover structure and an electronic device using the cover structure.

Description of Related Art

Along with the development of technologies, portable electronic devices, such as smart cell phones, tablet computers or notebook computers, have become indispensable tools of modern people. In order to enhance convenience of the portable electronic devices, designs thereof are all developed toward being lightweight and miniaturized. In the meantime, handling experience and stability of a user when holding a portable electronic device must also be considered. Otherwise, a scenario that the portable electronic device slips off the user's hand may likely occur. On the other hand, as peripheral accessories of the portable electronic devices are continuously launched, how to integrally design the portable electronic devices and the peripheral accessories to enhance convenience in use and portability has become one of the issues that related vendors attempt to solve.

SUMMARY

The invention provides a cover structure and an electronic device using the cover structure capable of not only meeting a demand for lightweight and miniaturized designs, but also enhancing handling experience and stability of holding.

A cover structure of the invention is suitable for a portable device. The cover structure includes a body, a first flexible component, an accommodation component, a second flexible component and a connection component. The first flexible component is connected to the body, and the accommodation component is connected to the first flexible component. The accommodation component has an accommodation groove configured for accommodating an object. The accommodation component and the body are respectively located at two opposite sides of the first flexible component. The second flexible component is connected to the accommodation component, and the first flexible component and the second flexible component are respectively located at two opposite sides of the accommodation component. The connection component is connected to the second flexible component, and the accommodation component and the connection component are respectively located at two opposite sides of the second flexible component. The connection component is connected to the body, and the connection component is configured for being connected to the portable device.

In an embodiment of the invention, the body includes a first portion and a second portion connected to each other, the second portion is located between the first portion and the first flexible component, and the second portion is connected to the first flexible component.

In an embodiment of the invention, the body further includes a first input component disposed at the first portion, and the first input component includes a touchpad.

In an embodiment of the invention, the body further includes a second input component disposed at the second portion, and the second input component includes a plurality of keys.

In an embodiment of the invention, the body further includes a folding portion connected to the first portion and the second portion.

In an embodiment of the invention, the accommodation component includes a rigid portion and a flexible portion, the accommodation groove penetrates at least a part of the rigid portion, and the flexible portion covers the rigid portion.

In an embodiment of the invention, the first flexible component and the second flexible component are respectively connected to the flexible portion to form an integrally formed structure.

In an embodiment of the invention, the accommodation groove has an opening, the first flexible component has a first side which is located at the same side as the opening, and the body has a second side which is located at the same side as the opening. The first side and the second side are aligned to each other, and there is a drop between the first side and an outer edge of the opening.

In an embodiment of the invention, the second flexible component has a third side which is located at the same side as the opening, and the third side and the first side are aligned to each other.

In an embodiment of the invention, the first flexible component further has a fourth side, the second flexible component further has a fifth side. The fourth side is connected to the first side and the outer edge of the opening, the fifth side is connected to the third side and the outer edge of the opening, and the fourth side and the fifth side are separated from each other.

In an embodiment of the invention, the accommodation groove has an opening, the first flexible component has a first side which is located at the same side as the opening, and the body has a second side which is located at the same side as the opening. The first side and the outer edge of the opening are aligned to each other, and there is a drop between the first side and the second side.

In an embodiment of the invention, the second flexible component has a third side which is located at the same side as the opening, and the third side and the first side are aligned to each other.

In an embodiment of the invention, an inner diameter is greater than a thickness of the first flexible component or a thickness of the second flexible component.

In an embodiment of the invention, the connection component is an electrical connection component electrically connected to the body and configured for being electrically connected to the portable device.

An electronic device of the invention includes a portable device and a cover structure. The cover structure includes a body, a first flexible component, an accommodation component, a second flexible component and a connection component. The first flexible component is connected to the body, and the accommodation component is connected to the first flexible component. The accommodation component has an accommodation groove configured for accommodating an object. The accommodation component and the body are respectively located at two opposite sides of the first flexible component. The second flexible component is connected to the accommodation component, and the first flexible component and the second flexible component are respectively located at two opposite sides of the accommodation component. The connection component is connected to the second flexible component, and the accommodation component and the connection component are respectively located at two opposite sides of the second flexible component. The connection component is connected to the body, and the connection component is configured for being connected to the portable device.

To sum up, the cover structure and the electronic device using the cove structure of the invention can meet the demand for lightweight and miniaturized designs. Meanwhile, a part of the cover structure can be adaptively deformed in accordance with a hand palm and a holding strength of the palm, such that the handling experience and the stability of holding the electronic device can be significantly improved. On the other hand, the electronic device and a peripheral accessory (e.g., the object) are integrally designed, such that the peripheral accessory (e.g., the object) may be accommodated in the cover structure and taken out therefrom when being needed. Thereby, the convenience in use and portability can be dramatically enhanced.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
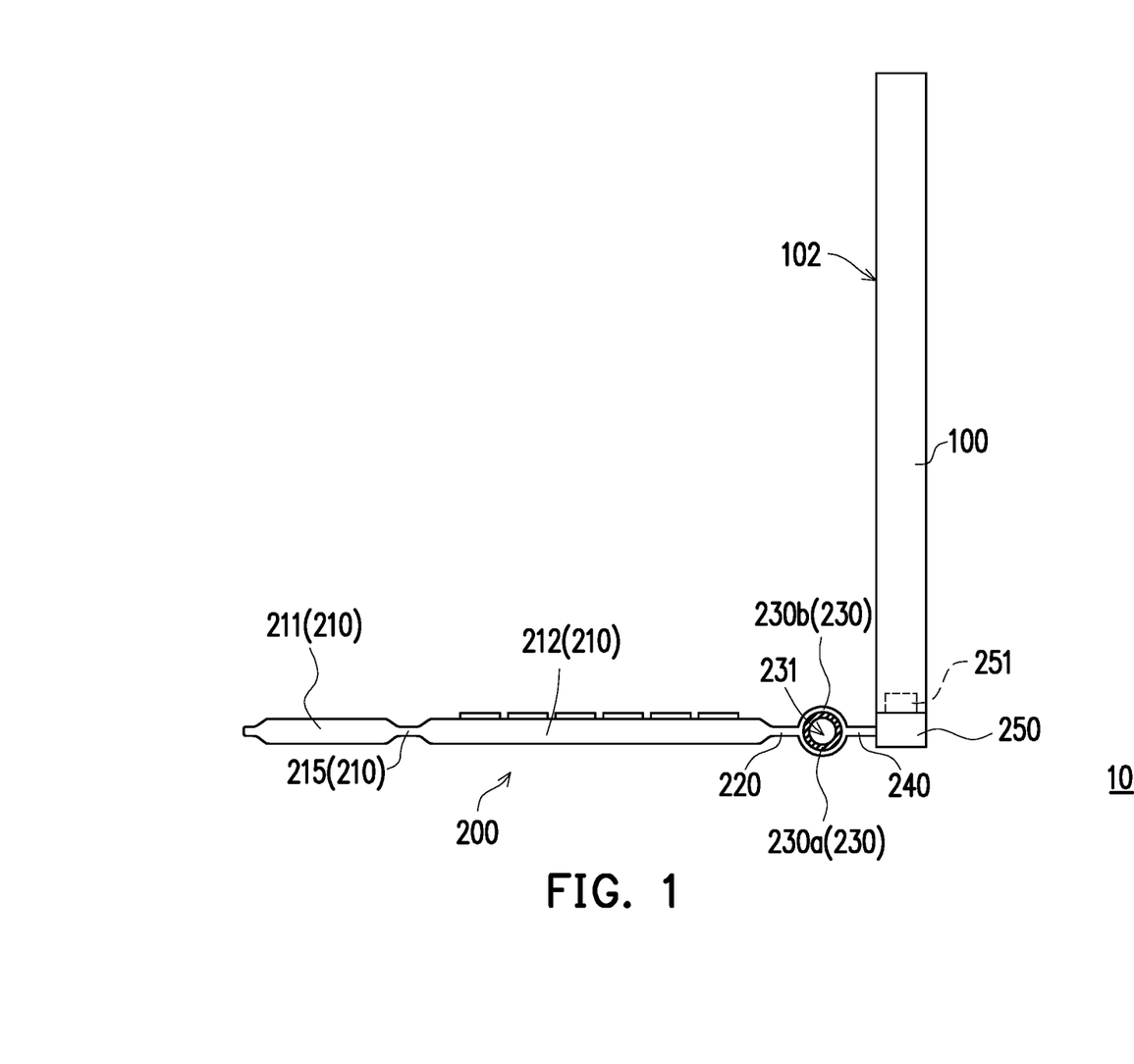
FIG. 1 is a schematic side view showing an electronic device according to a first embodiment of the invention.
Figure 2:
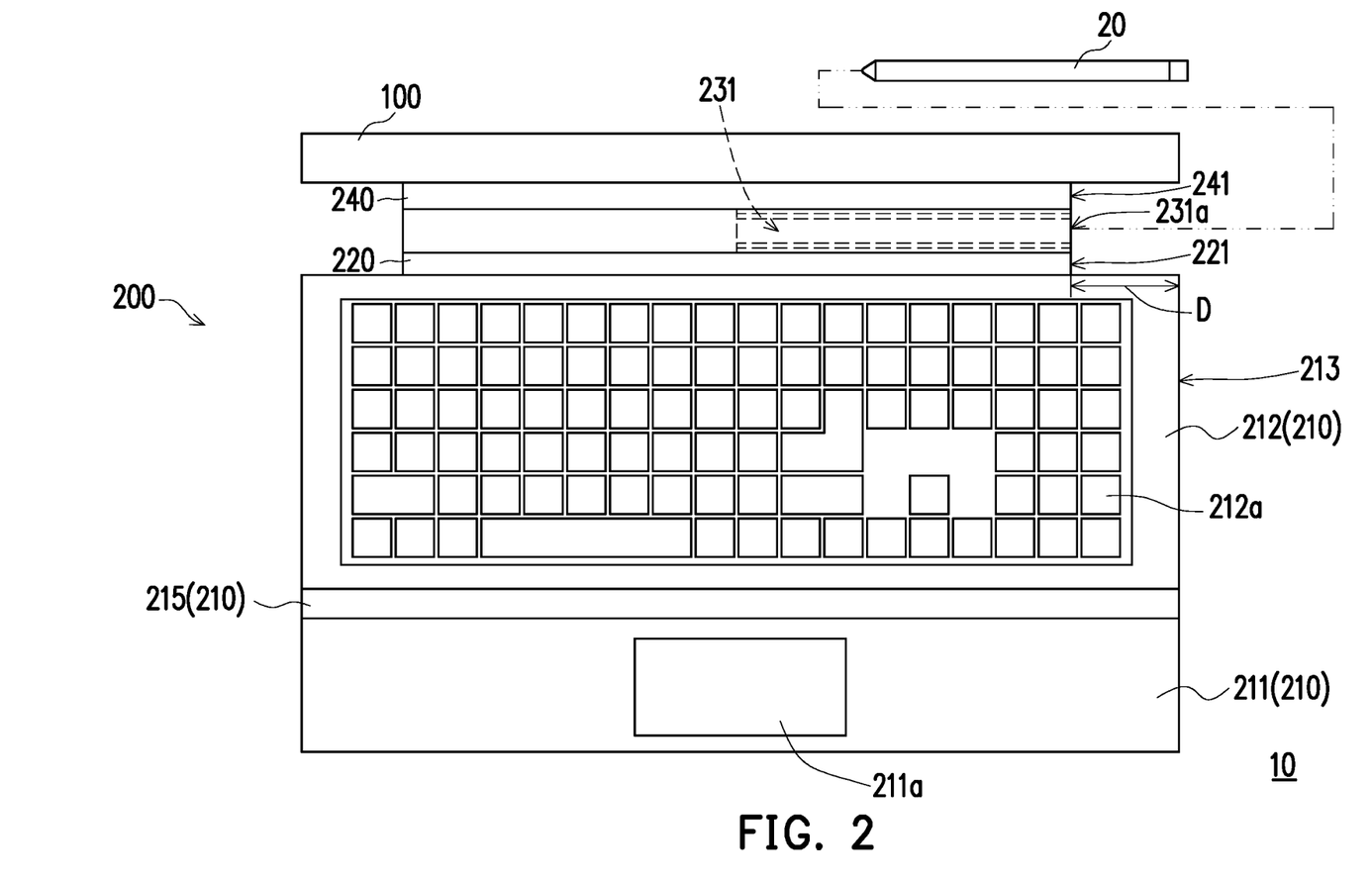
FIG. 2 is a schematic top view showing the electronic device according to the first embodiment of the invention.

FIG. 1 is a schematic side view showing an electronic device according to a first embodiment of the invention. FIG. 2 is a schematic side view showing an electronic device according to a first embodiment of the invention. Referring to FIG. 1 and FIG. 2, in the present embodiment, an electronic device 10 includes a portable device 100 and a cover structure 200. The portable device 100 may be a tablet computer or a smart cell phone, and the cover structure is configured to be combined with the portable device 100. By the cover structure 200 being covered on the portable device 100, the portable device 100 may be prevented from being destroyed or damaged by a part which is covered by the cover structure 200. For example, the cover structure 200 may be integrated with an input component and be electrically connected to the portable device 100. Thus, a user may operate the portable device 100 or input information to the portable device 100 through the cover structure 200.

The cover structure 200 includes a body 210, a first flexible component 220, an accommodation component 230, a second flexible component 240 and an electrical connection component 250, and the body 210 is connected to the electrical connection component 250 sequentially through the first flexible component 220, the accommodation component 230 and the second flexible component 240. Furthermore, two opposite sides of the first flexible component 220 are respectively connected to the body 210 and the accommodation component 230, and two opposite sides of the second flexible component 240 are respectively connected to the accommodation component 230 and the electrical connection component 250. Namely, the body 210 and the accommodation component 230 are respectively located at the two opposite sides of the first flexible component 220, the first flexible component 220 and the second flexible component 240 arc respectively located at two opposite sides of the accommodation component 230, and the accommodation component 230 and the electrical connection component 250 are respectively located at the two opposite sides of the second flexible component 240. For example, the first flexible component 220 is substantially connected to an intermediate point of one of the sides of the accommodation component 230, and the second flexible component 240 is substantially connected to an intermediate point of the other side of the accommodation component 230.

On the other hand, the electrical connection component 250 may be electrically connected to the body 210 through a corresponding wire (not shown), and the wire (not shown), for example, extends to pass through the second flexible component 240, the accommodation component 230 and the first flexible component 220 to extend into the body 210 to be electrically connected with an electronic component (not shown) inside the body 210. For example, the electrical connection component 250 may be a USB plug 251, and the portable device 100 has a USB slot (not shown) disposed corresponding to the USB plug 251. The USB plug 251 is inserted into the USB slot (not shown), such that the portable device 100 and the cover structure 200 are electrically connected to each other for signal or power transmission.

In the present embodiment, the accommodation component 230 has an accommodation groove 231 configured for accommodating an object 20. For example, the object 20 may be a stylus, but the invention is not limited thereto. In other embodiments, the object 20 may be a mobile power, a portable hard drive, an external expansion speaker or other peripheral accessories. Depending on a design requirement, a fixing component may be installed in the accommodation groove 230, thereby fixing the object 20 into the accommodation groove 230. Additionally, an electrical terminal may also be installed inside the accommodation groove 230, thereby electrically connecting the object 20 accommodated in the accommodation groove 230 to the electronic device 10. Namely, the electronic device 10 of the present embodiment may be integrally designed with a peripheral accessory, and the peripheral accessory may be accommodated in the cover structure 200 and taken out therefrom, when being in use, thereby dramatically enhancing the convenience in use and portability.

Figure 3:
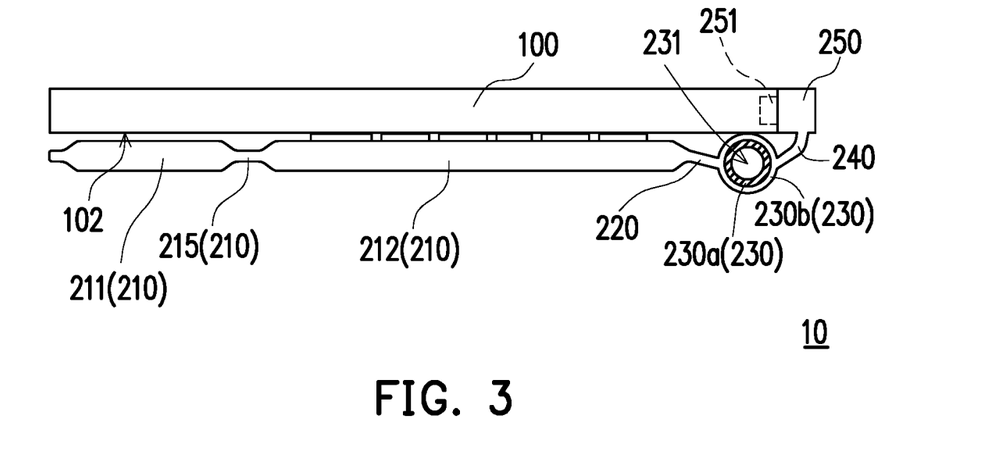
FIG. 3 is a schematic side view showing the electronic device depicted in FIG. 1 transferred to another state.

FIG. 3 is a schematic side view showing the electronic device depicted in FIG. 1 transferred to another state. Referring to FIG. 1 to FIG. 3, the electronic device 10 illustrated in FIG. 1 and FIG. 2 is in an expanded state, and the electronic device 10 illustrated in FIG. 3 is in a closed state. The body 210 of the cover structure 200 includes a first portion 211, a second portion 212 and a folding portion 215. The first portion 211 is connected to the second portion 212 through the folding portion 215, and the first portion 211 and the second portion 212 are respectively located at two opposite sides of the folding portion 215. Additionally, the second portion 212 is located between the first portion 211 and the first flexible component 220, and the second portion 212 is connected to the first flexible component 220. A first input component 211a is disposed at the first portion 211, and a second input component 212a is disposed at the second portion 212. The first input component 211a includes a touchpad, and the second input component 212a includes a plurality of keys. Thus, the user may operate the portable device 100 or input information to the portable device 100 through the first input component 211a or the second input component 212a. On the other hand, the first portion 211 may be folded relative to the second portion 212 through the folding portion 215, such that the first portion 211 may be stacked on and closed to a front surface or a back surface of the second portion 212. For example, the first input component 212a (i.e., the touchpad) on the first portion 211 is closed to the second portion 212. In other embodiments, the first portion may not include the first input component disposed thereon, or the second portion may not include the second input component disposed thereon.

On the other hand, the first flexible component 220 and the second flexible component 240 may be formed of silica gel, rubber or other flexible materials. The accommodation component 230 includes a rigid portion 230a and a flexible portion 230b, the accommodation groove 231 penetrates at least a part of the rigid portion 230a, and the flexible portion 230b covers the rigid portion 230a. The rigid portion 230a may be formed of a metal, an alloy, plastic, acrylic, a composite material or other suitable rigid materials and may be configured for protecting the object 20 accommodated in the accommodation groove 231 to prevent the object 20 accommodated in the accommodation groove 230 from being destroyed or damaged due to an external force. The flexible portion 230b may be formed of silica gel, rubber or other flexible materials to provide an effect of anti-slipping or cushioning. In the present embodiment, the flexible portion 230b is connected to the first flexible component 220 and the second flexible component 240 to form an integrally formed structure.

In the expanded state or the closed state, the portable device 100 may contact a work plane (not shown) with the body 210 and the accommodation component 230, and the flexible portion 230b of the accommodation component 230 may provide the effect of anti-slipping to prevent the electronic device 10 from easily slipping on the work plane (not shown). In the closed state, the accommodation component 230 contacts a display surface 102 of the portable device 100 with the flexible portion 230b, such that the flexible portion 230b may provide the effect of cushioning to prevent the cover structure 200 from damaging the portable device 100. Additionally, the flexible portion 230b may also provide the effect of anti-slipping to prevent the cover structure 200 from easily slipping on the display surface 102 of the portable device 100. In the present embodiment, an outer diameter or a thickness of the accommodation component 230 may be greater than a thickness of the body 210, a thickness of the first flexible component 220 and a thickness of the second flexible component 240, and an inner diameter of the accommodation groove 231 may be greater than the thickness of the first flexible component 220 or the thickness of the second flexible component 240. Thereby, when the electronic device 10 is placed on the work plane (not shown), the accommodation component 230 may provide an effect of support for the electronic device 10 to be slightly inclined.

On the other hand, in the closed state, the accommodation component 230 contacts a display surface 102 of the portable device 100 with the flexible portion 230b. Based on geometric shapes and size designs of the first flexible component 220, the accommodation component 230 and the second flexible component 240, the first flexible component 220 and the second flexible component 240 are respectively flexibly deformed and inclined with respect to the accommodation component 230. Thus, the first flexible component 220, the accommodation component 230 and the second flexible component 240 may form a geometric contour suitable for being held by the user's palm. Additionally, the first flexible component 220, the flexible portion 230b of the accommodation component 230 and the second flexible component 240 may be adaptively deformed in accordance with the holding strength of the palm, such that the handling experience and the stability of holding the electronic device 10 may be significantly improved.

Referring to FIG. 2, in the present embodiment, the accommodation groove 231 has an opening 231a, and the object 20 may be inserted into the accommodation groove 231 through the opening 231a. The first flexible component 220 has a first side 221 which is located at the same side as the opening 231a, and the body 210 has a second side 213 which is located at the same side a the opening 231a. The first side 221 is aligned to an outer edge of the opening 231a, there is a drop D between the first side 221 and the second side 213, and the second side 213 is connected to the first side 221 through the side 213. On the other hand, the second flexible component 240 has a third side 241 which is located at the same side as the opening 231a, and the outer edge of the opening 231a, the first side 221 and the third side 241 are aligned to one another. Based on a design of receding corresponding to the opening 231a of the accommodation groove 231, it contributes to improving the convenience in taking and placing the object 20.

Figure 4:
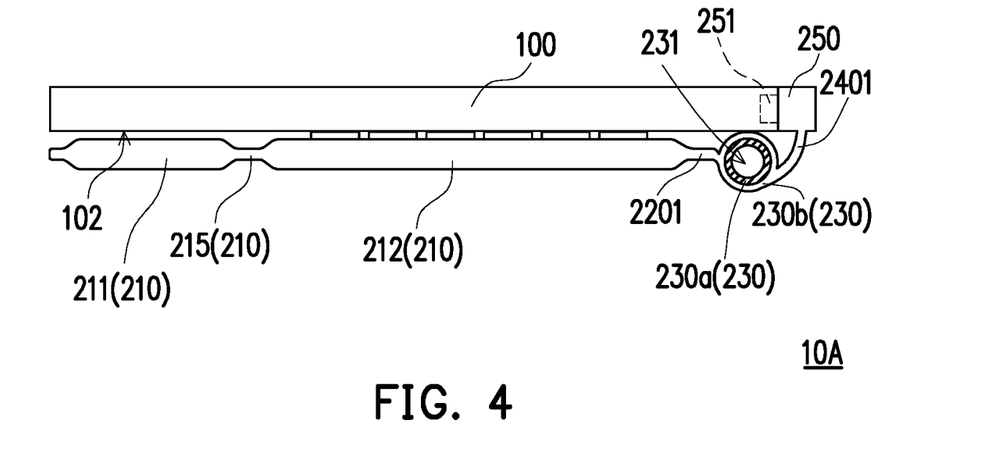
FIG. 4 is a schematic side view showing an electronic device according to a second embodiment of the invention.

FIG. 4 is a schematic side view showing an electronic device according to a first embodiment of the invention. Referring to FIG. 4, an electronic device 10A of the present embodiment is substantially similar to the electronic device 10 of the preceding embodiment, a difference therebetween lies in that in the present embodiment, a first flexible component 2201 is substantially connected to an intermediate point of one side of the accommodation component 230, and a second flexible component 2401 is substantially connected to a lower edge at the other side of the accommodation component 230. On the other hand, the electronic device 10A illustrated in FIG. 4 is in a closed state, wherein the second flexible component 2401 substantially presents an arc shape, and the first flexible component 2201 substantially linearly extends. Thus, the first flexible component 2201, the accommodation component 230 and the second flexible component 2401 may form a geometric contour suitable for being held by the user's palm. Additionally, the first flexible component 2201, the flexible portion 230b of the accommodation component 230 and the second flexible component 2401 may be adaptively deformed in accordance with the holding strength of the palm, such that the handling experience and the stability of holding the electronic device 10A may be significantly improved.

Figure 5:
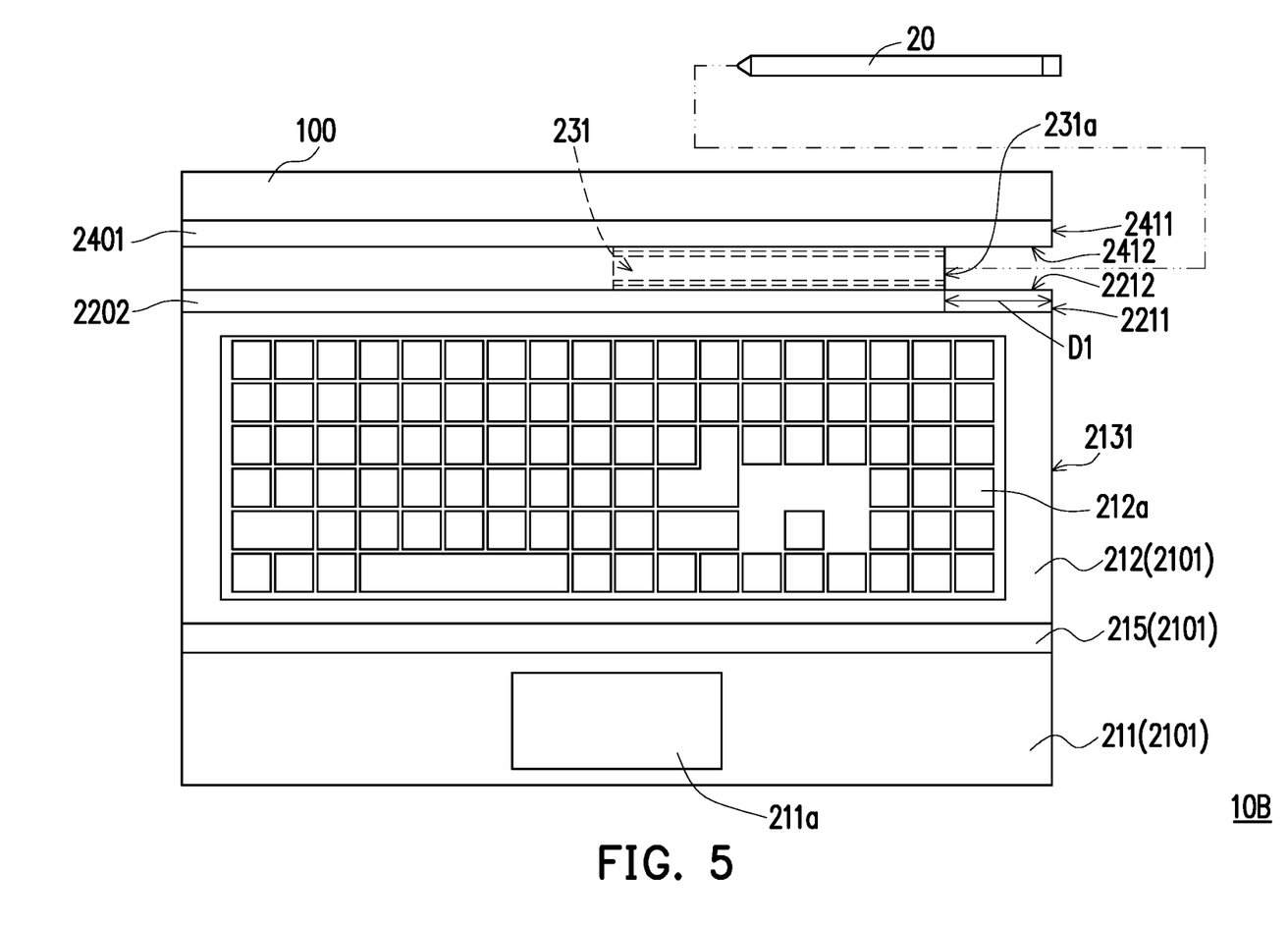
FIG. 5 is a schematic top view showing an electronic device according to a third embodiment of the invention.

FIG. 5 is a schematic side view showing an electronic device according to a first embodiment of the invention. Referring to FIG. 5, an electronic device 10B of the present embodiment is substantially similar to the electronic device 10 of the preceding embodiment, a difference therebetween lies in that in the present embodiment, a first flexible component 2202 has a first side 2211 which is located at the same side as the opening 231a, and a body 2101 has a second side 2131 which is located at the same side as the opening 231a. The first side 2211 and the second side 2131 are aligned to each other, and there is a drop D1 between the first side 2211 and the opening 231a. On the other hand, the second flexible component 2401 has a third side 2411 which is located at the same side as the opening 231a, and the first side 2211, the second side 2131 and the third side 2411 are aligned to one another.

Furthermore, the first flexible component 2202 further has a fourth side 2212, and the second flexible component 2401 further has a fifth side 2412. The fourth side 2212 and the fifth side 2412 are disposed side by side and are separated from each other. The fourth side 2212 is connected to the first side 2211 and the outer edge of the opening 231a, and the fifth side 2412 is connected to the third side 2411 and the outer edge of the opening 231a. Based on the design of receding corresponding to the opening 231a of the accommodation groove 231, it contributes to improving the convenience in taking and placing the object 20.

Figure 6:
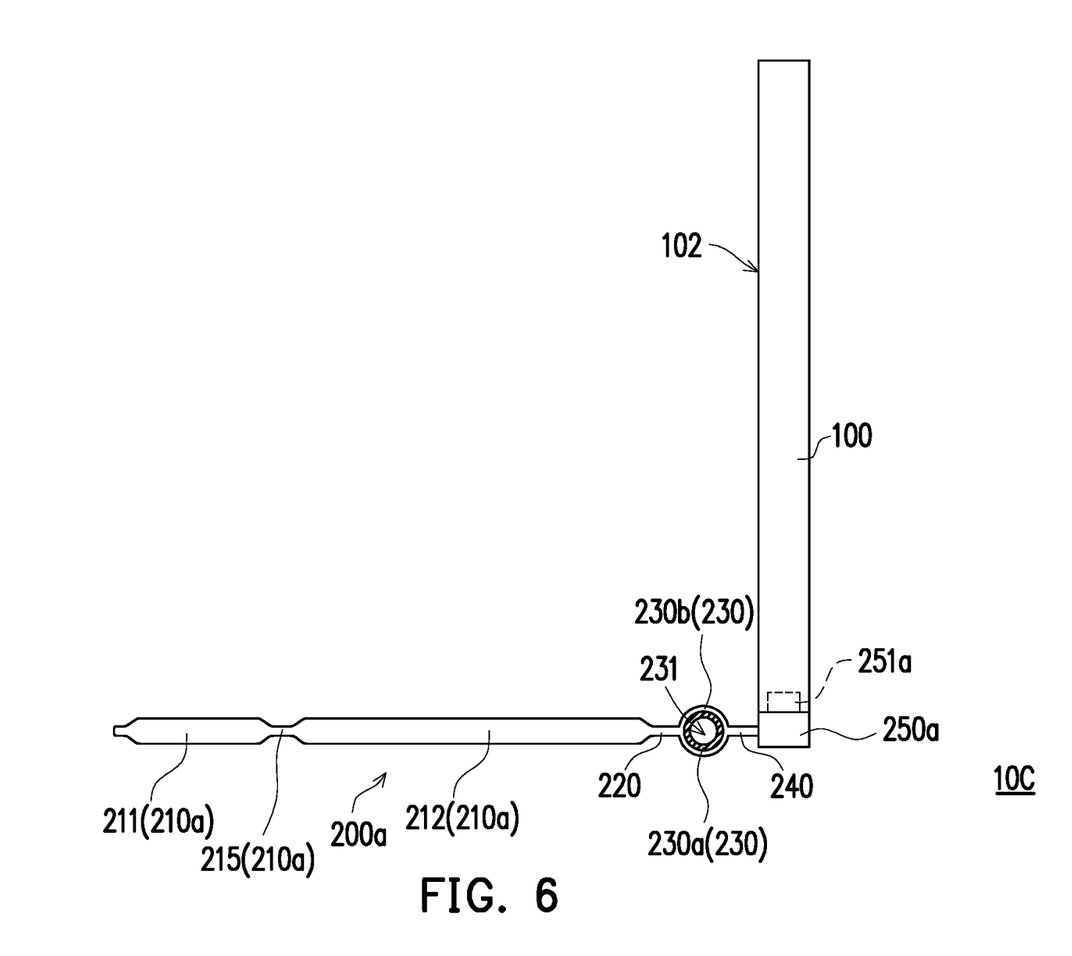
FIG. 6 is a schematic side view showing an electronic device according to a fourth embodiment of the invention.

FIG. 6 is a schematic side view showing an electronic device according to a fourth embodiment of the invention. Referring to FIG. 6, an electronic device 10C of the present embodiment is substantially similar to the electronic device 10 of the first embodiment, a difference therebetween lies in that in the present embodiment, a body 210a of a cover structure 200a does not include the keys or the touchpad disposed thereon, and when the cover structure 200a is covered on the display surface 102, the cover structure 200a functions in protecting the display surface 102. On the other hand, the cover structure 200a may be connected to the portable device 100 through a connection component 250a, wherein the connection component 250a may include a locking component 251a, and the portable device 100 has a locking groove (not shown) disposed corresponding to the locking component 251a. By locking the locking component 251a to the locking groove (not shown), the portable device 100 and the cover structure 200a are connected to each other.

Based on the above, the cover structure and the electronic device using the cove structure of the invention can meet the demand for lightweight and miniaturized designs. Additionally, a part of the cover structure can be adaptively deformed in accordance with the user's palm and the holding strength of the palm, such that the handling experience and the stability of holding the electronic device can be significantly improved. On the other hand, the electronic device and the peripheral accessory (e.g., the object) are integrally designed, the peripheral accessory (e.g., the object) can be accommodated in the cover structure and taken out therefrom when being needed, thereby dramatically enhancing the convenience in the use and the portability. Besides, the cover structure can be disposed with the touchpad and the keys for the user to operate the portable device or input information to the portable device.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A cover structure, suitable for a portable device, the cover structure comprising:
   a body;
   a first flexible component, connected to the body;
   an accommodation component, connected to the first flexible component, wherein the accommodation component has an accommodation groove configured for accommodating an object, and the accommodation component and the body are respectively located at two opposite sides of the first flexible component;
   a second flexible component, connected to the accommodation component, and the first flexible component and the second flexible component being respectively located at two opposite sides of the accommodation component; and
   a connection component, connected to the second flexible component, and the accommodation component and the connection component being respectively located at two opposite sides of the second flexible component, wherein the connection component is connected to the body, and the connection component is configured for being connected to the portable device.

2. The cover structure as claimed in claim 1, wherein the body comprises a first portion and a second portion connected to each other, the second portion is located between the first portion and the first flexible component, and the second portion is connected to the first flexible component.

3. The cover structure as claimed in claim 2, wherein the body further comprises a first input component disposed at the first portion, and the first input component comprises a touchpad.

4. The cover structure as claimed in claim 2, wherein the body further comprises a second input component disposed at the second portion, and the second input component comprises a plurality of keys.

5. The cover structure as claimed in claim 2, wherein the body further comprises a folding portion connected to the first portion and the second portion.

6. The cover structure as claimed in claim 1, wherein the accommodation component comprises a rigid portion and a flexible portion, the accommodation groove penetrates at least a part of the rigid portion, and the flexible portion covers the rigid portion.

7. The cover structure as claimed in claim 6, wherein the first flexible component and the second flexible component are respectively connected to the flexible portion to form an integrally formed structure.

8. The cover structure as claimed in claim 1, wherein the accommodation groove has an opening, the first flexible component has a first side which is located at the same side as the opening, the body has a second side which is located at the same side as the opening, the first side and the second side are aligned to each other, and there is a drop between the first side and an outer edge of the opening.

9. The cover structure as claimed in claim 8, wherein the second flexible component has a third side which is located at the same side as the opening, and the third side and the first side are aligned to each other.

10. The cover structure as claimed in claim 9, wherein the first flexible component further has a fourth side, the second flexible component further has a fifth side, the fourth side is connected to the first side and the outer edge of the opening, the fifth side is connected to the third side and the outer edge of the opening, and the fourth side and the fifth side are separated from each other.

11. The cover structure as claimed in claim 1, wherein the accommodation groove has an opening, the first flexible component has a first side which is located at the same side as the opening, the body has a second side which is located at the same side as the opening, the first side and an outer edge of the opening are aligned to each other, and there is a drop between the first side and the second side.

12. The cover structure as claimed in claim 11, wherein the second flexible component has a third side which is located at the same side as the opening, and the third side and the first side are aligned to each other.

13. The cover structure as claimed in claim 1, wherein an inner diameter of the accommodation groove is greater than a thickness of the first flexible component or a thickness of the second flexible component.

14. The cover structure as claimed in claim 1, wherein the connection component is an electrical connection component electrically connected to the body and configured for being electrically connected to the portable device.

15. An electronic device, comprising:
a portable device; and
a cover structure, comprising:
a body;
a first flexible component, connected to the body;
an accommodation component, connected to the first flexible component, wherein the accommodation component has an accommodation groove configured for accommodating an object, and the accommodation component and the body are respectively located at two opposite sides of the first flexible component;
a second flexible component, connected to the accommodation component, and the first flexible component and the second flexible component being respectively located at two opposite sides of the accommodation component; and
a connection component, connected to the second flexible component, and the accommodation component and the connection component being respectively located at two opposite sides of the second flexible component, wherein the connection component is connected to the body, and the connection component is configured for being connected to the portable device.

16. The electronic device as claimed in claim 15, wherein the body comprises a first portion and a second portion connected to each other, the second portion is located between the first portion and the first flexible component, and the second portion is connected to the first flexible component.

17. The electronic device as claimed in claim 16, wherein the body further comprises a first input component disposed at the first portion, and the first input component comprises a touchpad.

18. The electronic device as claimed in claim 16, wherein the body further comprises a second input component disposed at the second portion, and the second input component comprises a plurality of keys.

19. The electronic device as claimed in claim 16, wherein the body further comprises a folding portion connected to the first portion and the second portion.

20. The electronic device as claimed in claim 15, wherein the accommodation component comprises a rigid portion and a flexible portion, the accommodation groove penetrates at least a part of the rigid portion, and the flexible portion covers the rigid portion.

21. The electronic device as claimed in claim 20, wherein the first flexible component and the second flexible component are respectively connected to the flexible portion to form an integrally formed structure.

22. The electronic device as claimed in claim 15, wherein the accommodation groove has an opening, the first flexible component has a first side which is located at the same side as the opening, the body has a second side which is located at the same side as the opening, the first side and the second side are aligned to each other, and there is a drop between the first side and an outer edge of the opening.

23. The electronic device as claimed in claim 22, wherein the second flexible component has a third side which is located at the same side as the opening, and the third side and the first side are aligned to each other.

24. The electronic device as claimed in claim 23, wherein the first flexible component further has a fourth side, the second flexible component further has a fifth side, the fourth side is connected to the first side and the outer edge of the opening, the fifth side is connected to the third side and the outer edge of the opening, and the fourth side and the fifth side are separated from each other.

25. The electronic device as claimed in claim 15, wherein the accommodation groove has an opening, the first flexible component has a first side which is located at the same side as the opening, the body has a second side which is located at the same side as the opening, the first side and an outer edge of the opening are aligned to each other, and there is a drop between the first side and the second side.

26. The electronic device as claimed in claim 25, wherein the second flexible component has a third side which is located at the same side as the opening, and the third side and the first side are aligned to each other.

27. The electronic device as claimed in claim 15, wherein an inner diameter of the accommodation groove is greater than a thickness of the first flexible component or a thickness of the second flexible component.

28. The cover structure as claimed in claim 15, wherein the connection component is an electrical connection component electrically connected to the body and configured for being electrically connected to the portable device.

* * * * *